United States Patent [19]
Higgins et al.

[11] Patent Number: 5,911,543
[45] Date of Patent: *Jun. 15, 1999

[54] METHOD OF CONTROLLING EROSION AND CREATING AN ENVIRONMENT FOR THE FORMATION OF A GROWTH MEDIUM

[75] Inventors: Timothy R. Higgins, Tucson; Jesse D. Mitchell, Claypool; Todd R. Breen, Oracle; Andrew A. Brodkey, Tucson, all of Ariz.

[73] Assignee: BHP Copper Inc., Tucson, Ariz.

[ * ] Notice: This patent is subject to a terminal disclaimer.

[21] Appl. No.: 08/987,658

[22] Filed: Dec. 9, 1997

Related U.S. Application Data

[63] Continuation of application No. 08/558,436, Nov. 16, 1995, Pat. No. 5,695,301.

[51] Int. Cl.[6] ........................................................ C05F 5/00
[52] U.S. Cl. ................................ 405/258; 71/15; 405/303
[58] Field of Search .......................... 71/9, 15; 405/258, 405/271, 303

[56] References Cited

FOREIGN PATENT DOCUMENTS

| 2 478 427 | 9/1981 | France . |
|---|---|---|
| 40 33 917 | 4/1992 | Germany . |
| 42 40 580 | 6/1994 | Germany . |

Primary Examiner—David J. Bagnell
Assistant Examiner—Tara L. Mayo
Attorney, Agent, or Firm—Snell & Wilmer L.L.P.

[57] ABSTRACT

The present invention relates to a method of controlling erosion and creating a growth medium capable of supporting plant life. The method comprises the steps of analyzing a site, determining the amount and type of a mulch to be applied to the site, determining the desired conditions of the site and the length of time for placing animals on the site and applying mulch and animals to the site to produce conditions suitable for generation of the growth medium such as soil. The present invention further relates to an automated site reclamation control system which utilizes a control system processor to control the amount of feed and water supplied to the feed and water troughs, as well as the location of the troughs thus controlling the location and movement of the animals on the reclamation site thereby optimizing the creation of the growth medium.

21 Claims, 6 Drawing Sheets

METHOD OF CONTROLLING EROSION AND CREATING AN ENVIRONMENT FOR THE FORMATION OF A GROWTH MEDIUM

CROSS REFERENCE TO RELATED APPLICATIONS

This application is a continuation of U.S. application Ser. No. 08/558,436, now U.S. Pat. No. 5,695,301, filed Nov. 16, 1995, the specification of which is hereby incorporated by reference.

TECHNICAL FIELD

The present invention relates, generally, to a method for treating ground areas to prevent erosion, and, more particularly, to a method that utilizes animals to enhance organically a mulch compound incorporated into a site area preventing erosion and creating a growth medium capable of supporting plant life.

BACKGROUND ART AND TECHNICAL PROBLEMS

Milling and concentrating nonferrous metals from ore material mined through open pit and underground mining methods removes most of the metals and generates sterile crushed rock of uniform size having little or no organic value. This crushed rock, commonly known as "mine tailings" is normally deposited in surface impoundments or tailing dams. Tailings generally contain metals in a bound, non-extractable form, and a significant degree of moisture (up to 15%). Tailing dams or impoundments can range in size from several acres to thousands of acres, and can be up to hundreds of feet high.

Generally, the tailings are deposited on or near the mine site in plain view which tends to create aesthetic problems. Moreover, the tailing dams create environmental concerns generally related to dust and water erosion problems. In particular, because the mine tailings constitute very fine rock particles, wind can create the possibility of dust storms. In addition, severe rainstorms or other weather conditions can erode the tailing dams, washing the fine rock particles down into streams or other water sources. Because the tailings are high in metal content, including lead, having them washed downstream or breathed by people may be hazardous.

Most state reclamation laws in the United States require the preservation and reapplication of original top soil or "best available growth media" on mine waste or mill tailings to facilitate revegetation. Conventional reclamation practices include soil covering, hydromulching, and/or applying crushed rock to the tailing piles.

Soil covering generally consists of applying a layer of soil over the top of the tailing dams to prevent erosion of the tailings. The soil can be either preserved from the mine when it is initially dug, or borrowed from the top soil of other areas. The soil covering technique is intended to support vegetation to control erosion of the soil, influence water infiltration into the tailing dams. provide a medium for root penetration, and provide mechanical strength for the long term.

Hydromulching, which is often used in conjunction with soil covering, is the process of combining mulch, fertilizer, seed, a binding agent such as tachifier and water into a sprayable mixture, and spraying that mixture onto the soil cover to induce the growth of vegetation and to keep the soil cover in place.

Several problems with soil covering and hydromulching exist. First, it is very expensive to haul large amounts of top soil onto the tailing dams and then apply the hydromulching process. The mining companies must remove soil from other areas, load it onto trucks, spread it on the dams with ground moving equipment, and then apply the hydromulching process. Second, the top soil generally must be mined or borrowed from other places. Third, because the tailings and the soil are of different consistencies, they do not blend, and after several years, the soil tends to erode and fall off the dam slopes in large pieces. Finally, soil covering techniques can only be effectively used on inactive tailing dams. Tailings are placed in the impoundments or dams while they are still very wet from the mining process. As new tailings are added, additional water is added as well. If a soil cover is placed on an active dam while new tailings (and water) are added, a perched water table tends to evolve, causing a very instable structure. In some cases, water pressure building beneath a soil cover will actually blow the soil cover completely off the dam. Obviously, many problems can arise in such a case.

The other conventional erosion control technique consists of applying a thin layer of crushed rock over the tailings to prevent them from blowing and/or washing off. After the rocks are applied, the crevices and gaps between the rocks can trap wind blown seeds allowing for some vegetational growth on the dams. However, as with soil covering, the crushed rock approach has several negative aspects. First, aesthetically, the site appearance is not generally enhanced as the rock tends not to be much better than the tailings. Further, unless a substantial amount of rock is applied, and generally reapplied over time, the application tends to be nothing more than a temporary solution. Moreover, because both the rock and the tailings have little or no organic value, even if seeds are trapped between the rocks, very few if any will germinate and grow. Finally, as with soil covering, hauling large amounts of crushed rock onto the tailing dams can be very expensive.

Tailing dams also tends to contain and hold water, something like a sponge, for very long periods of time. However, because tailings provide little or no organic value, plant life generally cannot be sustained.

As will be appreciated, there thus exists a long felt need for an inexpensive, yet effective method of controlling erosion and building a growth medium that will sustain vegetation on tailing impoundments or dams, as well as on decertified areas of the desert, areas damaged by poor grazing practices, and other generally disturbed areas of the world.

SUMMARY OF THE INVENTION

In accordance with one aspect of the present invention a method for controlling erosion and creating a growth medium capable of supporting plant life comprises the steps of analyzing a site, determining the amount and type of mulch to be applied to the site, determining the desired conditions of the site and length of animal placement on the site, applying mulch and animals to the site to produce conditions suitable for generation of a growth medium.

In accordance with further aspects of the present invention various apparatus for carrying out this and derivative methods are provided.

BRIEF DESCRIPTION OF THE DRAWING FIGURES.

Preferred exemplary embodiments of the present invention will hereafter be described in conjunction with the appended drawing figures, wherein like designations denote like elements, and.

DETAILED DESCRIPTION OF PREFERRED EXEMPLARY EMBODIMENTS

The present invention generally relates to a method of controlling erosion, as well as producing organic growth medium that is capable of supporting plant life. More particularly, the method generally relates to a process for creating a productive. organic growth medium from essentially worthless waste lands as well as other generally damaged or disturbed areas.

Growth medium (e.g., soil) formation typically is the result of climate and living matter acting upon rock and soil material over a period of time (See J. H. Afanasieve, "The Classification Problem in Russian Soil Science,"*Pedology, Academy of Science*, Leningrad, U.S.S.R., 1927, 5.) For soil formation to occur, five factors are generally needed: 1) a parent material; 2) climate (moisture); 3) biosphere; 4) relief (position and slope of the land); and 5) time.

In the context of the present invention, growth medium formation is engendered as a result of a variety of factors for a variety of different site compositions. It should be appreciated that in the context of the present invention virtually any troubled environment may be treated to enhance growth medium formation, including, for example, mine tailings, waste rock, decertified areas of the desert, areas damaged by poor grazing practices, nutrient depleted farm lands, etc. However, as previously noted, a particularly advantageous site composition with which the present invention may be employed comprises mine tailing dams. The present invention will therefore be described in that context. The skilled artisan, however, will readily appreciate a variety of other applications for use of the subject invention, some of which are listed herein and all of which are within the scope of this invention.

In the context of mine tailing dams, the tailings constitute the parent material. Generally, it takes nature thousands of years to reduce rock structures to small particles through freeze/thaw and erosion activity, however, milling practices reduce thousands of tons of solid rock into tiny particles each day. Under normal conditions, climate (water availability) is generally an important factor for soil development. However, in tailing dams, water is abundant, and, thus, a trivial element to the process. The problem is that the mine tailings do not contain the organic or living matter necessary to sustain the growth medium formation.

As will be discussed in greater detail hereinbelow, a preferred method, in accordance with the present invention, generally provides the needed living matter to the site to promote growth medium formation. In accordance with a preferred aspect of the present invention, cattle or other livestock or animals are suitably used as a tool to promote growth medium formation through the introduction of organic matter and other material into the site. More particularly, the method of the present invention combines carbon from a mulch material with nitrogen from livestock excrement to encourage the formation of a biosphere and ultimately growth medium development. Animal movement about the site tends to encourage mixing of the mulch (carbon source) and the livestock excrement (nitrogen source) with the site materials creating the needed mixture for growth medium development. In accordance with this methodology, the surface is stabilized and thus provides the necessary environment for growth medium (e.g. soil) development. In addition, the methodology of the present invention can be altered to create different soil conditions depending on the economic goals of the land owner. That is, the method can be used to create environments suitable for crop production, grass land production, forest land production or livestock rearing, or the method can be used to convert land back to its natural conditions.

Figure 1:
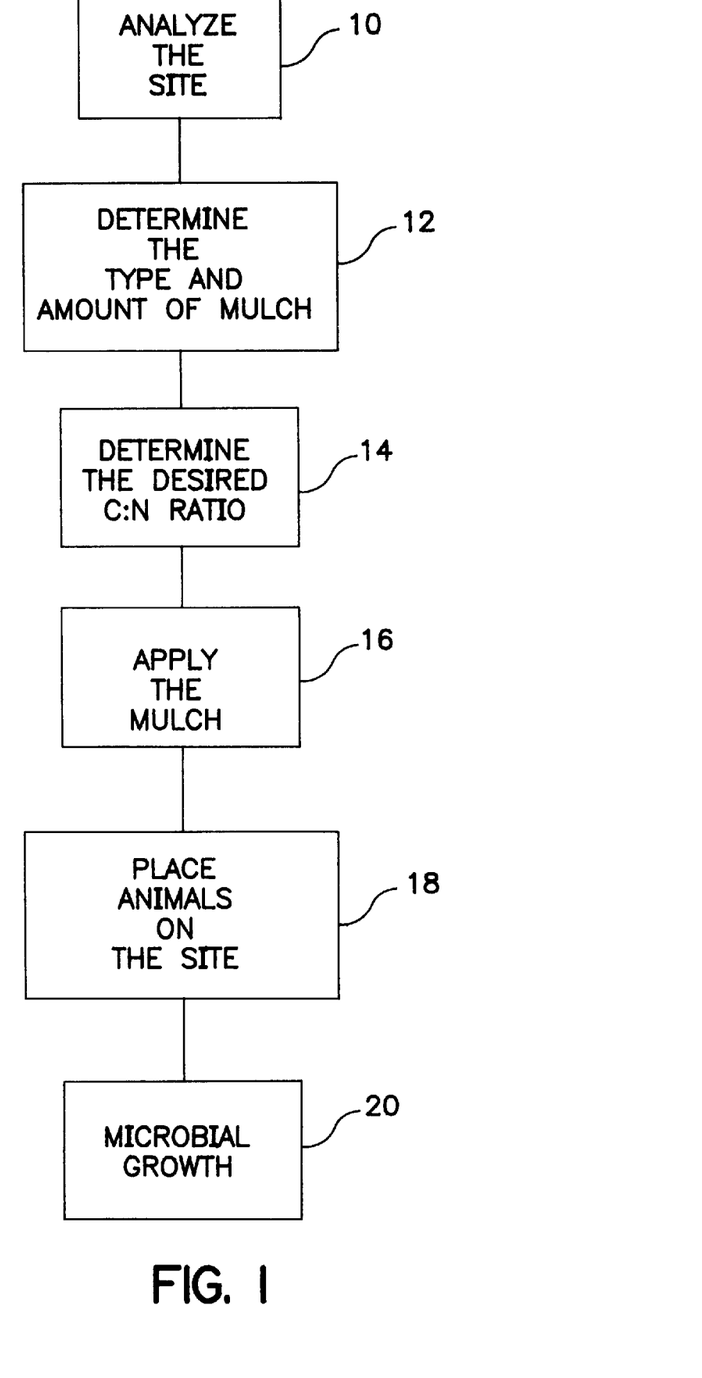
FIG. 1 is a flow chart of a preferred methodology in accordance with the present invention.

Referring now to FIG. 1, in accordance with a preferred embodiment of the present invention, a method generally comprises a first step 10 of analyzing a site, a second step 12 of determining the type and amount of mulch to be applied to the site, a third step 14 of determining the desired carbon to nitrogen ratio to be used at the site, the further steps 16 of applying the mulch and 18 of placing animals on the site, and ultimately a step 20 of growing microbes and other organic matter within the treated site.

As discussed in greater detail hereinbelow, preferably in accordance with analysis step 10, the composition and the slope of the ground at the site is determined. More particularly, the ground may be analyzed for texture, density, percent sand, percent clay, percent silt, and moisture content, as well as any other ground or soil tests that may be pertinent in determining the composition and nutritional value of the ground. As will be appreciated, such analysis is conducted in accordance with conventional processes. As will be further appreciated, through analyzing the site, the particular composition of materials is determined. As noted hereinabove, various site compositions may be treated in accordance with the present invention, and the particular manner of treatment depends in large part on the site composition determination.

In accordance with a further aspect of analysis step 10, a site analyst may survey the site to determine its contour and slope also in accordance with conventional techniques, such that the analyst may determine the amount of erosion that may occur if the site is left untreated.

In accordance with mulch determination step 12, the type and amount of mulch to be applied is established. To induce microbial growth, carbon and nitrogen are generally needed. In accordance with a preferred aspect of the present invention, carbon is applied to the site by the application of the mulch, and thus, the amount of mulch applied to the site tends to be a determination of the amount of carbon at the site.

The type of mulch applied to the site can be any mulch composition, such as hay, straw, green waste and/or the like. In accordance with a preferred aspect of steps 12 and 16, the type of mulch determined may constitute green waste which is thereafter applied in appropriate amounts to the site. Green waste, which generally comprises ground-up trees, shrubs, leaves, grasses, and the like, is particularly advantageous for this application because it is relatively inexpensive, does not blow in the wind, and, in general, the livestock used to work the site tend to not eat it. While in certain applications the mulch material may also serve as a source of food for the animals working the site, preferably the mulch material is selected such that it is not a food source thus tending to sustain a uniform carbon source throughout the site. In addition, the green waste may contain seeds from perennial plants such as trees. grasses, shrubs and the like, thus reducing the need to reseed the area after the methodology of the present invention has been employed. Once the growth medium (e.g. soil) develops to the point where it can maintain plant life, such seeds may germinate and foliage will begin to grow.

In accordance with mulch determination step 12, the amount of mulch to be applied to the site can be determined in many ways. Preferably. the amount of mulch to be applied to a site is determined in accordance with USDA guidelines that set forth the amount of mulch needed to prevent erosion for different types of soil compositions. Through analysis step 10, the percent of sand, silt, and clay in the ground is obtained. and thus renders mulch determination obtainable from application of USDA guidelines; these measurements enable determination of the amount of mulch needed to prevent the site from eroding.

After the amount of mulch, and, therefore the amount of carbon, to be applied to the site is determined, the appropriate carbon to nitrogen (C:N) ratio to be used at the site is determined (Step 14). In general, the establishment of this ratio will dictate, inter adia, the type and amount of livestock treatment necessary at the site. For example, a particular C:N ratio will determine for a particular application the amount of nitrogen that the livestock must apply over a given period of time. In accordance with a preferred aspect of the invention, the C:N ratio can be in the range of about 0 to about 30:1, and preferably in the range of about 5:1 to about 20:1, and more preferably about 19:1. Moreover, the anticipated use of the site may dictate the C:N ratio to be applied. For example, in accordance with one aspect of the present invention, soil formation may be the goal. In that case, the C:N ratio may be in the range of about 0 to 10:1, and more preferably in the range of about 2:1 to about 9.5:1, and optimally about 9:1. In accordance with a further aspect of the present invention, immediate plant growth may be the goal. Accordingly, the C:N ratio may be in the range of about 10:1 to 30:1, and more preferably in the range of about 12:1 to 20:1, and optimally about 19:1. In accordance with yet another aspect of the present invention, the goal may be to first build soil, then grow vegetation. Accordingly, it may be preferable to start with a low C:N ratio in the range of about 0 to about 5:1, and preferably about 2:1. As microbes begin to grow, they will consume nitrogen, causing the C:N ratio to increase. When the C:N ratio reaches about 10:1, soil generally will at least have begun to be formed, and the C:N ratio will have increased to a level substantially effective to sustain vegetation (e.g. plant life).

In accordance with a preferred aspect of the present invention, in connection with mulch application step 16, the mulch may be applied to the site by any conventional means of applying or spreading mulch, hay or the like to an area. For example, the mulch material may be applied by hand, by truck, by a hay or mulch spreader, or by a hay or mulch blower.

In accordance with one aspect of the present invention, a hay or mulch blower may be used to spread mulch, such as green waste or the like, onto a site. In accordance with this aspect of the invention, the mulch material (e.g. green waste) is first bundled into bails and thereafter fed to a spreading device preferably substantially similar to conventional hay blowers and the like. In accordance with one aspect of the present invention, a binding agent, such as tachifier, flubber, or the like. can be applied to the green waste so that it can be bundled. Any traditional hay bailing type equipment may be used to bundle the green waste into bails.

Still referencing mulch application step 16, and in accordance with a preferred embodiment of the present invention, tachifier is used as the binding agent. Preferably, the tachifier comprises a starch based organic compound which acts as both a binding agent for the mulch and a repellant to the livestock. Tachifier, while being generally safe to the animals, tends to be very bitter, and, thus, discourages them from eating the mulch. This is particularly advantageous because the mulch material, and the green waste in particular, has very little nutritional value to the livestock, and ingestion, in some cases, may actually have detrimental effects on the animals. Moreover, in accordance with a preferred aspect of the present invention, the mulch material is selected such that the livestock are discouraged from eating the mulch, thereby tending to inhibit depletion of the carbon source at the site, and reduce the need to apply additional mulch.

Still referring to mulch application step 16, and in accordance with a further embodiment of the invention, before the livestock is placed at the site, the mulch can be disked or plowed into the ground so that the carbon source will be positioned beneath the surface in the range of about 0 to 3 feet, and preferably at about 2 feet. In accordance with this preffered aspect of this invention, as nitrogen is applied to the site by the livestock, rain and other moisture will cause the nitrogen to leach down into the ground, interacting with the carbon in the mulch beneath the surface of the ground and inducing growth medium formation at depths of up to 3 feet or more.

As mentioned above, livestock, or animals in general, are the primary source for nitrogen. It should be noted that the livestock used in accordance with the present invention may comprise any type of livestock including cattle, sheep, pigs, horses and the like. However, to facilitate ease of discussion, the livestock, preferably in accordance with a particularly preferred embodiment of the present invention, comprise cattle.

The livestock, for example, the cattle, through excrement, provide nitrogen advantageous for creating an environment suitable for microbial growth and formation of a growth medium (e.g. soil). In accordance with a preferred embodiment of the invention, the amount of nitrogen applied to the site will be a function of a predetermined carbon to nitrogen (C:N) ratio. In addition to providing the required nitrogen for soil formation, the livestock (e.g. cattle) may perform other functions important to formation of a growth medium and erosion control. For example, the natural movement of the livestock, particularly cattle, through the site is advantageous. As the cattle move about the site, their hoofs interact with the site surface, to beneficially mix deposited excretions (i.e. the primary site nitrogen source) with the mulch (the primary site carbon source), thus creating an optimal environment for soil formation. In addition, the interaction of the cattle hoofs and the ground tends to aerate the mixture thus further encouraging an advantageous growth medium. In accordance with a further aspect of the invention, as the cattle traverse the site, they create horizontal pathways or benches which serve to control erosion. In accordance with a preferred aspect of the present invention, and with reference to livestock (e.g. cattle) application step 18, the duration of livestock treatment is a function of, inter alia, the desired carbon to nitrogen ratio, the carbon content of the mulch and the nitrogen producing potential of the livestock used at the site. In describing this relationship, the present inventors have devised what they refer to as the EMPACP™ equation (EMPACT™ refers to Environmental Mining Practices and Cattle Treatment). The so-called EMPACT™ equation can be used, inter alia, to calculate the number of days to leave the cattle at the site to produce an environment suitable for the formation of a growth medium and can be expressed as follows:

$$EMPACT = (Mc \times Csite)/NDA$$

where NDA is nitrogen per animal day.

Mc is a constant comprising the inverse of the desired C:N ratio,

Csite is the amount of carbon per hectare applied to the site, and

EMPACT is the number of animal days per hectare.

In accordance with this relationship, the parameters are either known, derivable from available information, or can be set or constant. For example, NDA can be derived from information on livestock behavior; it is generally known that on the average, cattle produce about 0.0055 tons of actual nitrogen per day. Therefore, NDA is 0.0055 tons. Similarly, the carbon content of the mulch material may be derived and determined. Different types of mulch contain different quantities of carbon. For purposes of this example, the type of mulch applied is green waste. It is generally known that approximately 20% of green waste is carbon, thus Csite (carbon content), assuming about 200 tons of mulch per hectare is applied to the site is approximately 40 tons per hectare. The constant, as noted, is the inverse of the desired C:N ratio. That is, if the desired C:N ratio for the particular site is 19:1, Mc will be $\frac{1}{19}$. Assuming the foregoing and also that 100 head of cows are placed at the site, the EMPACT equation can be used to determine the number of days to leave the cows at the site. for example, as follows:

$$EMPACT = 40/(0.0055 \times 100 \times 19) = 3.8 \text{ days}$$

In accordance with a preferred aspect of the present invention, the livestock are removed from the site after the desired or determined time period. Preferably, the site is thereafter left alone so microbial growth can occur (Step 20, FIG. 1). Microbes or microorganisms generally are present in the mulch and in the excrement from the cattle. On their own, these microbes cannot survive. However, in accordance with the present invention, an environment suitable for formation of a growth medium is advantageously obtained as the cattle traverse the site creating a suitable nitrogen and carbon mixture that provides the nutrients required for the microorganisms to survive. As the microorganisms grow, they produce by-products of organic acids which act as binding agents that break down silicates, reform and aggregate particles, and form clays and silts from the silicates. This process actually turns the sand into silts and clays, thus creating an organic growth medium from virtually worthless, sandy silicate material.

The present inventors have found that when the method of the present invention is applied to mine tailings, for example, mine tailing dams, organic soil can be formed relative quickly. For example, typically the mine tailings have a composition of about 80–92% sand, about 5–15% silt, and about 3–6% clay. In a quite surprising and unexpected manner, after the process of the present invention has been performedlon such tailings, the percentage of sand can decrease up to about 20–40% and the clay and silt percentages can increase about 5–10% and about 20–30%, respectively, all within days to weeks after commencement. As will be appreciated, such compositional changes evidence soil formation. In particular, this tends to illustrate that the sand particles will break down to form silt and clay particles, thus forming the building blocks of organic soil. In addition to the improved soil structure, the soil will contain microorganisms, carbon, nitrogen and other compounds that are advantageous for plant life support.

In accordance with one aspect of the present invention, the cattle, other livestock or animals may be fed out of feed troughs suitably positioned about the site. The feed can be any type of feed suitable for the specific animal at the site and can include feeds that are optimal for birthing, weight gain, flouraging or the like. Moreover, under some circumstances and in certain locations, specially formulated supplemental feeds may be used to help the livestock reach the proper weight gain goals or maintain proper nutrient levels during use on the site.

It should be noted that the type and quantity of feed supplied to the cattle or other livestock may depend on. among other things, the location of the site, the site conditions as determined in site analysis step 10, and the purpose and objective of the cattle (e.g., beef production, cattle reproduction, milk production, etc.).

Figure 2:
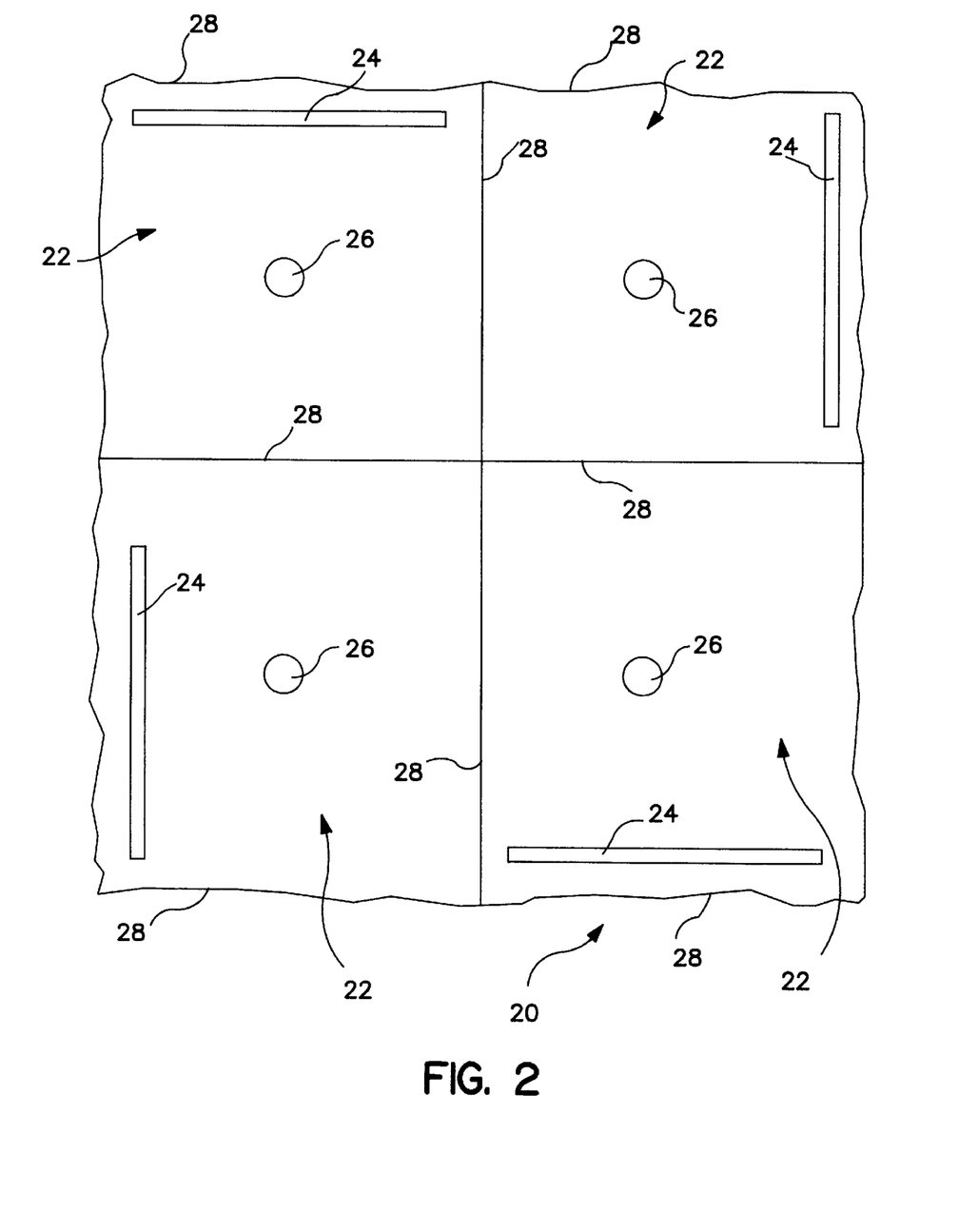
FIG. 2 depicts an alternate embodiment of a site layout wherein a feed trough is positioned at four different locations on the perimeter of the site and a water trough is positioned at the center of the site.

Referring now to FIG. 2, and in accordance with a preferred embodiment of the present invention, livestock can be fed using a site maintenance system 20 suitably comprising a feed trough 24 and a water trough 26 which are strategically placed on a site 22 to optimize cattle movement across site 22. In accordance with a preferred aspect of this embodiment of the present invention, feed trough 24 preferably may be placed on a perimeter 28 of site 22 while water trough 24 is placed at or near the center of site 22. Such a configuration encourages the livestock to traverse between feed trough 24 and water trough 26, thus depositing and mixing excrements into the mulch/tailings composition in the area between troughs 24 and 26. In accordance with this preferred embodiment, and as shown in the other quadrants of FIG. 2, when one area of site 22 is adequately traversed or worked by the livestock, feed trough 24 can be moved to another position on perimeter 28 of site 22 enabling the livestock to traverse a new section of site 22 between food trough 24 and water trough 26. This process can be repeated until site 22 is adequately and entirely traversed or worked by the livestock.

Figure 3:
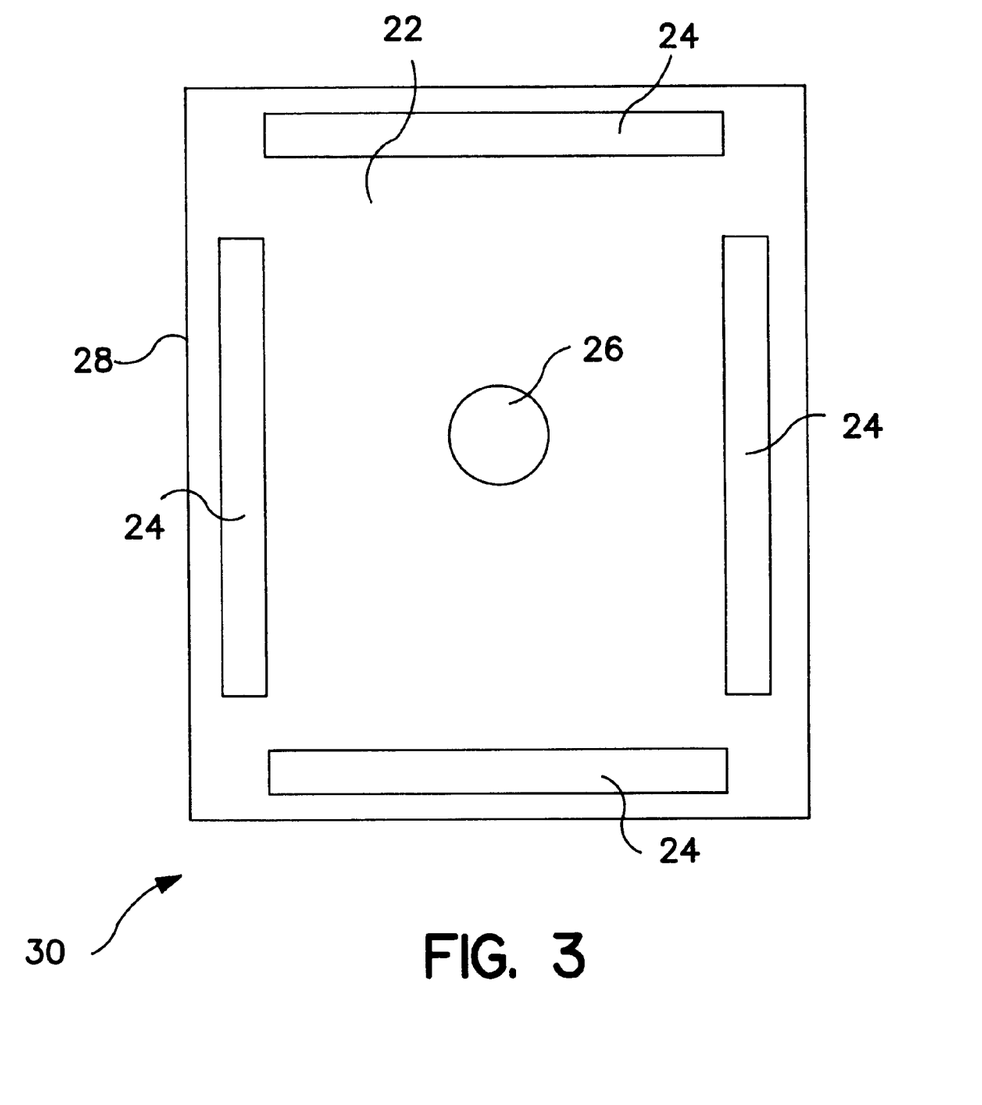
FIG. 3 depicts a further alternate embodiment of a site layout wherein feed troughs are positioned around the perimeter of a site, and a water trough is placed at the center of the site.

Referring now to FIG. 3, in accordance with a further embodiment of the present invention, a feeding system 30 preferably comprising feed troughs 24 suitably positioned around substantially the entirety of perimeter 28 with water trough 26 being suitably positioned in the center of site 22. In accordance with this embodiment, the water source (i.e. water trough 26) for the livestock will remain in the center of site 22 while the food source can be moved around perimeter 28 of site 22 by filling different portions of feed troughs 24. Movement of the food source tends to encourage the livestock to traverse different paths between the food and water sources on site 22, thus advantageously working the entire site.

Figure 4:
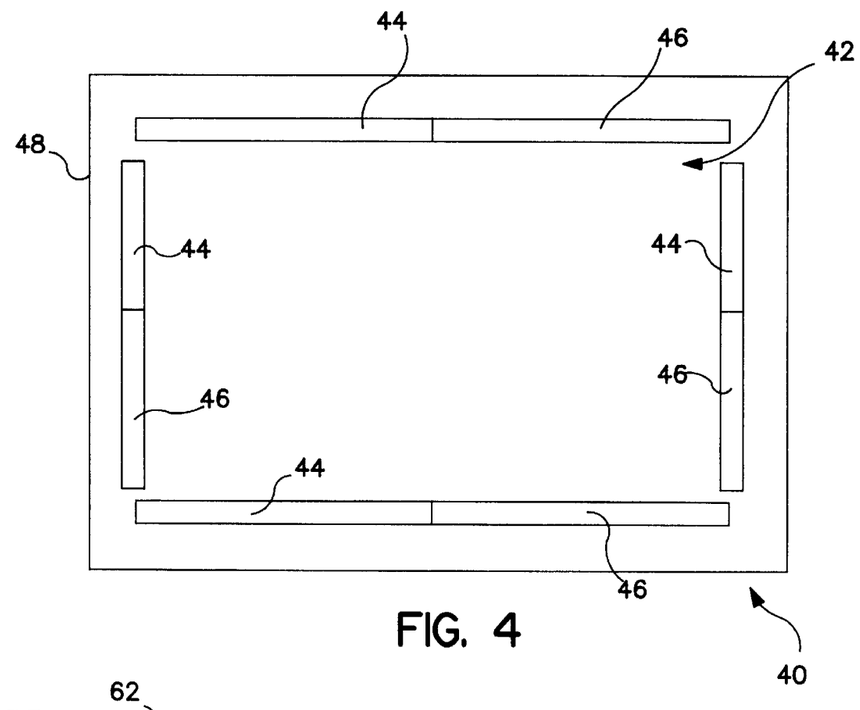
FIG. 4 depicts a still further alternate embodiment of a site layout wherein a feed troughs and a water troughs are positioned around the perimeter of the site.

Referring now to FIG. 4, and in accordance with a further embodiment of the present invention, a feeding system 40 preferably comprises a feed trough 44 and a water trough 46 positioned around a perimeter 48 of a site 42 in an alternating configuration. In this configuration, food and water can be supplied to any combination of feed troughs 44 and water troughs 46 such that all sections of site 42 are traversed by the livestock. When a section of site 42 has been sufficiently worked by the livestock, the food source, the water source, or both can be moved to different feed troughs 44 and/or water troughs 46 so that a different section of site 42 is worked by the livestock. This process can be repeated until the entire site is worked.

Figure 5:
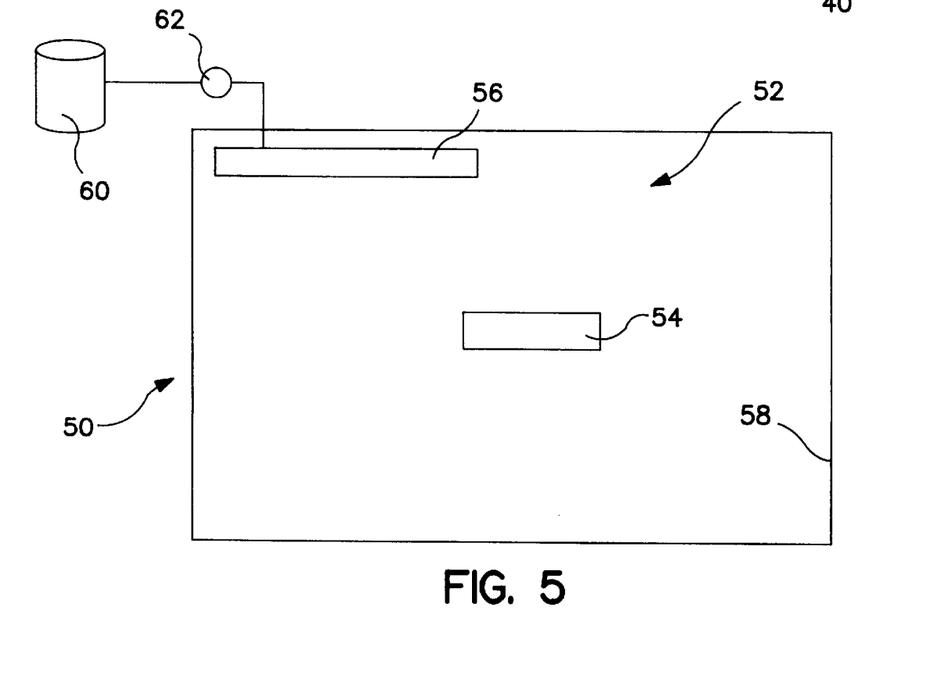
FIG. 5 depicts yet another alternate embodiment of a site layout wherein a water trough is positioned at the perimeter of a site and is connected to a substantially constant water source. and wherein a feed trough is positioned at the center of the site.

Referring now to FIG. 5, and in accordance with a further embodiment of the present invention. a feeding and automated watering control system 50 preferably comprises a stationary feed trough 54 preferably positioned at the center of site 52 and a moveable water trough 56 preferably positioned at a perimeter 58. In this configuration, the livestock will traverse between water trough 56 and food trough 54. When a new section of site 52 needs to be worked, water trough 56 can be moved to a different position on perimeter 58. In a further aspect of this embodiment, water trough 56 may be connected to a constant water source 60 via a water pump 62. When water in water trough 56 drops below a predetermined minimum level. pump 62 can be activated, forcing water to flow from water source 60 to water trough 56.

Figure 6:
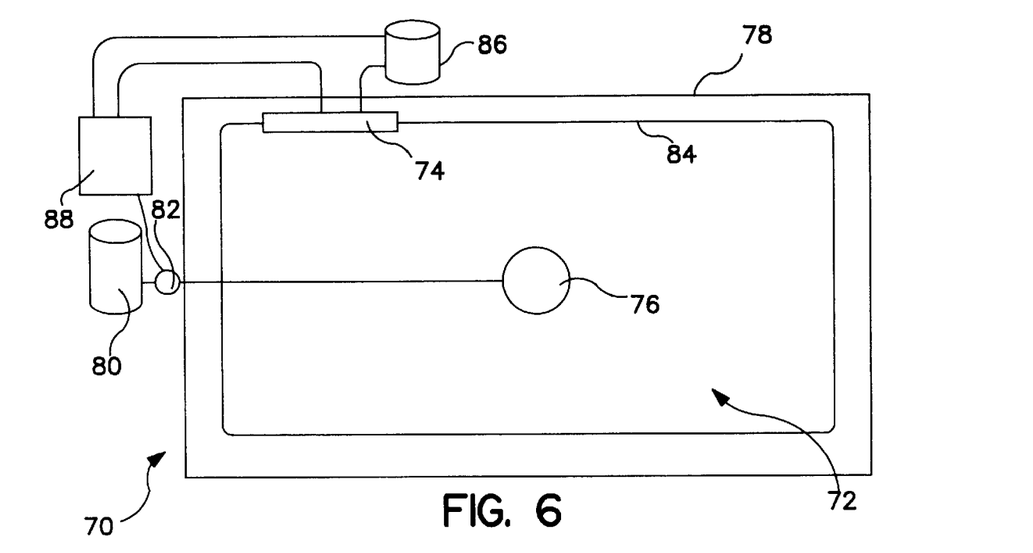
FIG. 6 depicts another further alternate embodiment of a site layout wherein the feeding and watering system is controlled by a computerized control system.

Referring now to FIG. 6, and in accordance with a further embodiment of the present invention, an automated feeding and watering control system 70 comprises a feed trough 74 which may be movably positioned about a perimeter 78 of a site 72, and a water trough 76 which may be suitably positioned at or near the center of site 72. In accordance with this preferred embodiment, feed trough 74 may be connected to and may travel upon a rail 84 which is installed around substantially the entirety of perimeter 78. In addition, feed trough 74 is connected to an automated constant feed source 86. Similarly, water trough 76 is connected to a constant water source 80 via pump 82. Pump 82, feed trough 74, and feed source 86 are all connected to control system 88. When the water level in trough 76 goes below a predetermined minimum level, control system 88 will activate pump 82, filling water trough 76. In a similar manner, when the feed in feed trough 74 drops below a minimum level, control system 88 will cause feed from feed source 86 to be deposited in feed trough 74. After the livestock have adequately worked a section of site 72, control system 88 will automatically cause feed trough 74 to move about perimeter 78 along rail 84 to a new position. In this manner, the livestock will be encouraged to traverse or work a new section of site 72. Feed trough 74 may be moved around the entire perimeter of site 72, ensuring that the entire site is worked by the livestock.

Figure 7:
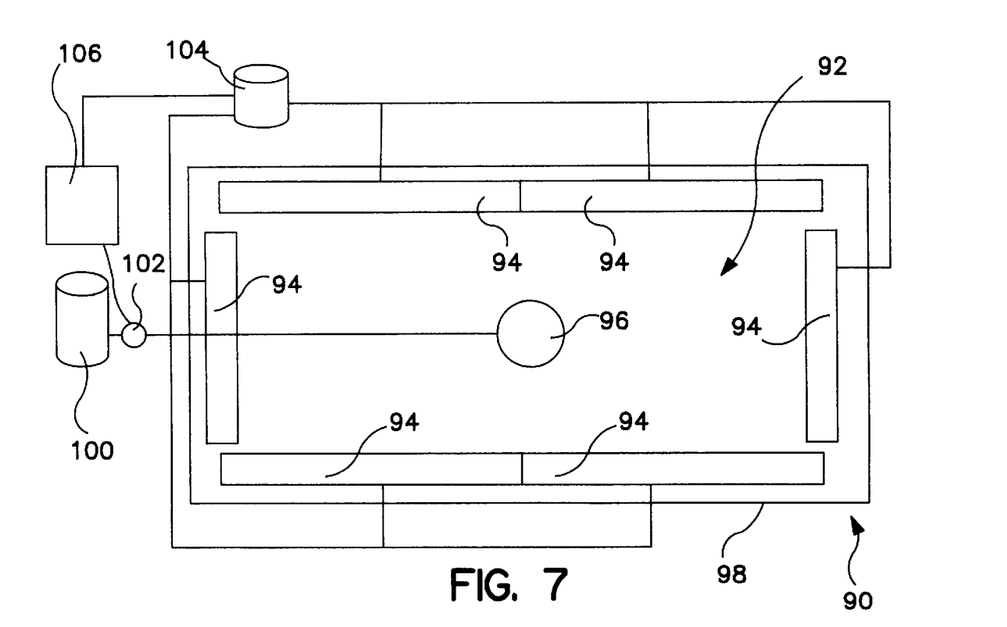
FIG. 7 depicts another alternate embodiment of a site layout wherein, feed troughs are positioned around the perimeter of a site and the feeding and watering system is controlled by a computerized control system.

Referring now to FIG. 7, and in accordance with a further embodiment of the present invention, an automated feeding and watering control system 90 comprises a plurality of feed troughs 94, a water trough 96, a feed source 104, a water source 100, a pump 102, and a control system 106. In accordance with this preferred embodiment, feed troughs 94 suitably may be positioned around substantially the entirety of a perimeter 98 with each portion of feed troughs 94 connected to feed source 104. In accordance with this preferred embodiment, control system 106, which is connected to feed source 104, will cause feed source 104 to distribute food to a portion of feed troughs 94. Similarly, control system 106 will monitor and fill water trough 96, via water source 100 and pump 102. That is, as the water level drops below a minimum level, control system 106 will activate pump 102 causing water from water source 100 to fill water trough 96. Further, control system 106 will monitor site 92, and more particularly, the length of time that the livestock work a specific section of site 92. When control system 106 determines that an area has been adequately worked by the livestock, control system 106 will cause a different portion of feed troughs 94 to be filled. In this manner, control system 106 can encourage the livestock to traverse different sections of site 92 as needed.

It should be noted that the configurations of the feed and water troughs are not limited to the embodiments described herein, rather, the feed and water troughs may be suitably configured in any manner on a site so as to advantageously encourage traversion of the site as required.

Figure 8:
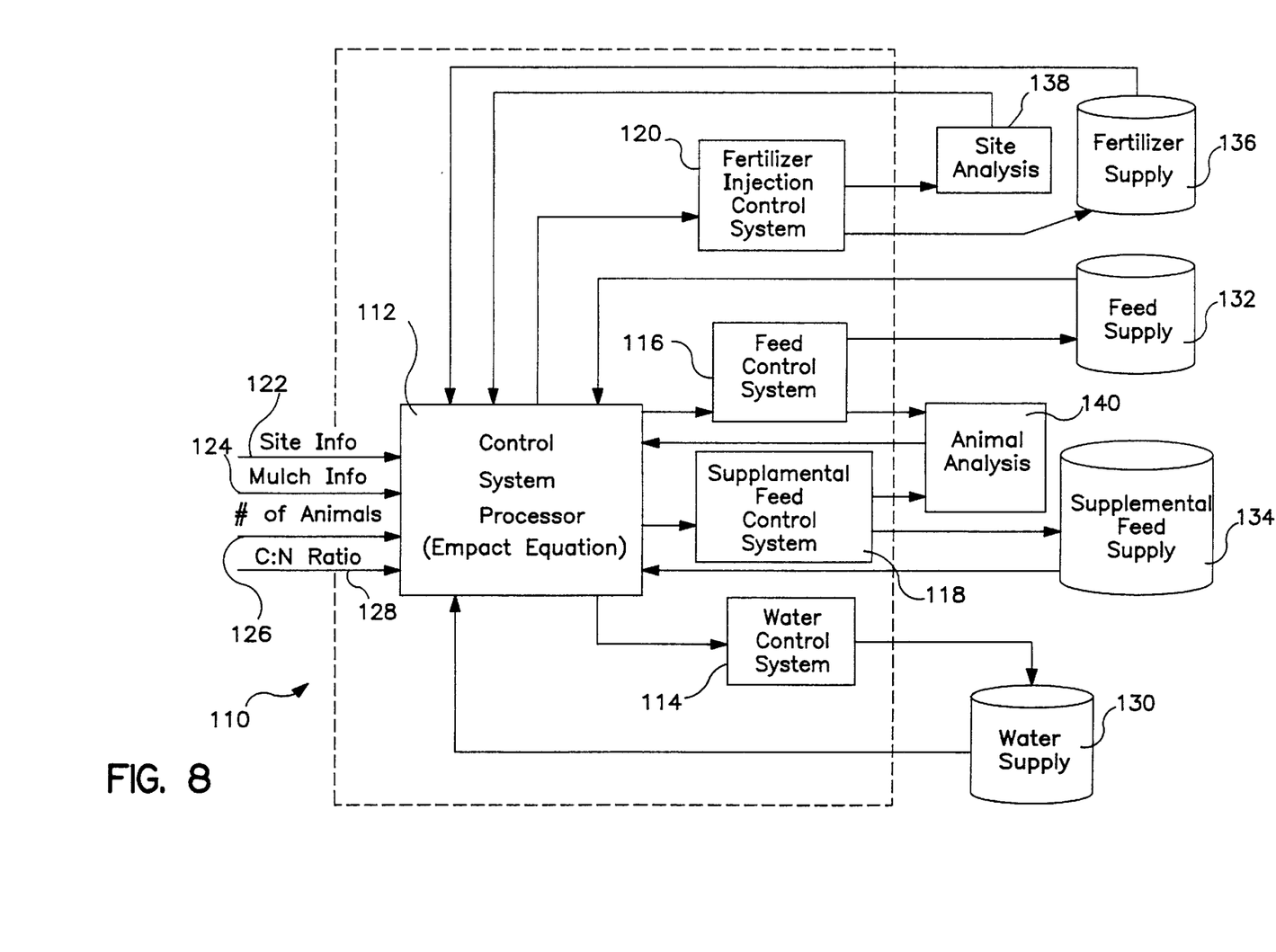
FIG. 8 is a further illustration of the computerized control system of the site layout of FIG. 7.

Referring now to FIG. 8, one embodiment of a computerized feeding and watering control system 110 will be discussed in greater detail herein. Control system 110 may suitably comprise a control system processor 112, a water control system 114, a feed control system 116, a supplemental feed control system 118, and a fertilizer injection system 120.

Control system processor 112 may be suitably connected to water control system 114, feed control system 116, supplemental feed control system 118, and fertilizer injection system 120. In addition, processor 112 is configured to receive input data regarding site information 122, mulch information 124, number of animals 126, and C:N ratio information 128 as well as any other data necessary to control the site. Data 122-28 may be input into processor 112 by any conventional input device currently known or hereinafter devised. including but not limited to keyboard entry, magnetic tape or diskettes, and CD ROM. Processor 112 is also configured to receive feedback information from a water supply 130, a feed supply 132, a supplemental feed supply 134, a fertilizer supply 136, a site analysis station 138 and an animal analysis station 140.

In accordance with this preferred embodiment, data 122-128 will be input into processor 112. According to the input data 122-128, processor 112 will determine the amount of feed and water required to feed the animals at the site. Processor 112 will also determine which feed troughs and water troughs (shown in FIGS. 2–7) will be used at that time. Processor 112 will then activate water control system 114 and feed control system 116 to cause water to be distributed from water supply 130 into the water troughs, and feed to be distributed from feed supply 132 to the feed troughs. Next, using data 122-128 and the foregoing equation, which may be either stored in or input into processor 112, processor 112 will determine the length of time the livestock should traverse a specific section of a site. When a computed time period elapses, processor 112 will activate water control system 114 and feed control system 116 causing either the water or the feed or both to be moved to a different position on the site, encouraging the livestock to traverse a different section of the site. Processor 112 will repeat this procedure until the entire site has been adequately traversed by the livestock according to the foregoing equation.

In certain instances, the present invention can be used in conjunction with beef production. That is, beef cattle can be applied to a site and the cattle, upon completion of the process, can be utilized for beef. Accordingly, while at the site the cattle are supplied with nutrition to enable weight gain. In accordance with this aspect of the present invention, processor 112 can be configured to monitor the health and nutritional input of the cattle by receiving data from animal analysis station 140. Station 140, either electronically or manually, will accumulate data regarding the weight, blood nutrients, blood toxins, health, and any other data that will be useful to processor 112 in determining the health of the animals. If processor 112 determines that the cattle need feed supplements, vitamin supplement. medicine or the like, processor 112 will activate supplemental feed control system 118 causing feed supplements from supplemental feed supply 134 to be added to the feed. This feedback system will help the beef cattle achieve maximum weight gain and remain in good health while they are traversing and working a site.

In accordance with the beef production aspect of the present invention, a concern with placing beef cattle on mine tailings is whether the metals, including lead, in the tailing dams would affect the animals Several tests have been conducted, including blood and tissue biopsies, and the results of which demonstrate that cattle used to work mine tailing dams receive no detrimental effects from the mine tailings. That is, the blood metal levels detected were well below acceptable levels.

In accordance with a further aspect of this embodiment, it may be necessary to supply additional nutrients to the soil to achieve the desired soil goals. Accordingly, processor 112 can control the flow of fertilizer to the site to supplement the growth medium formation process. Processor 112 will receive data from a site analysis station 138. Station 138 will monitor the site, either automatically or manually, to determine if the proper C:N ratio is present, or if any other soil supplement is needed to achieve the desired soil goals. If processor 138 determines that the site is devoid of certain nutrients, it will activate fertilizer injection control system 120 which will distribute fertilizer from fertilizer supply 136 to the site. The fertilizer can be applied to the site by a sprinkler system, a drip system, or any other automated fertilizer distribution system known or hereinafter developed.

It should be noted that fertilizer can be applied to any site and is not limited to use with control system 112. That is, fertilizer can be applied to a site manually, or can be applied with an automated fertilizer system that is not controlled by control system 112. It should also be noted that fertilizer can be applied to a site before, during or after the animals are placed at the site. Additionally, the animals can be removed, fertilizer applied, and the animals replaced as necessary to achieve the appropriate soil goals.

It will be understood that the foregoing description is of preferred exemplary embodiments of the invention, and that the invention is not limited to the specific forms shown or described herein. Various modifications may be made in the design and arrangement of the elements set forth herein without departing from the scope of the invention as expressed in the appended claims.

We claim:

1. An site reclamation system for treating a surface material at a site, the system comprising:
   a predetermined amount of a carbon source applied to the site;
   a predetermined number of animals placed on the site, wherein said animals produce an amount of nitrogen containing material and said animals cause said carbon source, said nitrogen containing material, and the surface material to mix;
   an automated water control system, wherein said water control system comprises a water supply and is configured to control water flow from the water supply to said predetermined number of animals;
   an automated feed control system, wherein said feed control system comprises a feed supply and is configured to control the flow of food from the feed supply to said predetermined number of animals; and
   a system processor connected to said automated water control system and said automated feed control system, wherein said system processor is configured to receive input data.

2. The site reclamation system in claims 1 wherein the water supply may be movably positioned on the site.

3. The site reclamation system in claim 1, wherein the feed supply may be movably positioned on the site.

4. The site reclamation system in claim 3, further comprising a rail on the site, wherein the feed supply is connected to said rail , and the feed supply may be moved about the site on said rail.

5. The site reclamation system in claim 1 further comprising:
   a plurality of feed troughs connected to the feed supply and said system processor, wherein said system processor causes the feed supply to distribute food to a portion of said plurality of feed troughs.

6. The site reclamation system in claim 1, further comprising:
   a supplemental feed supply; and
   a supplemental feed system connected to said supplemental feed supply and said control system processor.

7. The site reclamation system in claim 1, further comprising:
   a site analysis station connected to said system processor; and
   a fertilizer injection system.

8. The site reclamation system in claim 7 wherein said fertilizer injection system is connected to said system processor.

9. The site reclamation system in claim 1, further comprising an animal analysis station connected to said system processor.

10. A method useful for treating a surface material at a site, the method comprising the steps of:
    determining a composition of the surface material at the site;
    determining a desired effect of the treating of the surface material;
    determining a desired carbon to nitrogen ratio to aid in achieving said desired effect;
    determining a type and an amount of a carbon source to be applied to the site;
    determining a number of animals to be placed on the site, wherein said animals provide nitrogen to the site;
    determining a length of time that said animals should remain on the site to reach said desired carbon to nitrogen ratio;
    applying said carbon source to the site; and
    placing said determined number of animals on the site for said determined length of time;
    wherein said determined number of animals will traverse the site, causing said carbon source, said nitrogen containing materials and the surface material to mix, creating the determined carbon to nitrogen ratio in the surface material.

11. The method of claim 10 further comprising encouraging a growth of microorganisms in the surface material.

12. The method of claim 10 further comprising the step of:

determining a number of animal days per hectacre, wherein said number of animal days per hectacre is calculated according to:

EMPACT=(Mc×Csite)/NDA wherein Mc is a constant comprising the inverse of said desired carbon to nitrogen ratio, Csite is an amount of carbon per hectacre applied to the site, NDA is an amount nitrogen produced per animal day, and EMPACT is said number of animal days per hectacre.

13. The method of claim 10 further comprising the step of automatically controlling an amount of water distributed to said animals.

14. The method of claim 10 further comprising the step of automatically controlling an amount of animal food distributed to said animals.

15. The method of claim 10 further comprising selecting a surface material to be treated, wherein the surface material comprises mine tailings.

16. The method according to claim 10 further comprising the step of maintaining said desired carbon to nitrogen ratio between about 0 and about 30:1.

17. The method according to claim 10, further comprising the step of encouraging said animals to traverse the site, thereby mixing said carbon source, said nitrogen containing materials, and the surface material.

18. The method according to claim 1, further comprising the step of adding a binding agent to said carbon source.

19. The method according to claim 1, further comprising the step of plowing said carbon source into the surface material.

20. A site reclamation system for use in connection with the method of claim 10 to form a growth medium, comprising:

at least one feed trough positioned on the site; and at least one water trough positioned on the site.

21. The site reclamation system of claim 24 wherein said at least one feed trough and said at least one water trough are moved relative to a portion of the site.

* * * * *